July 4, 1933.  E. B. MALOON  1,916,864
SCRAPER
Filed May 20, 1931  4 Sheets-Sheet 1
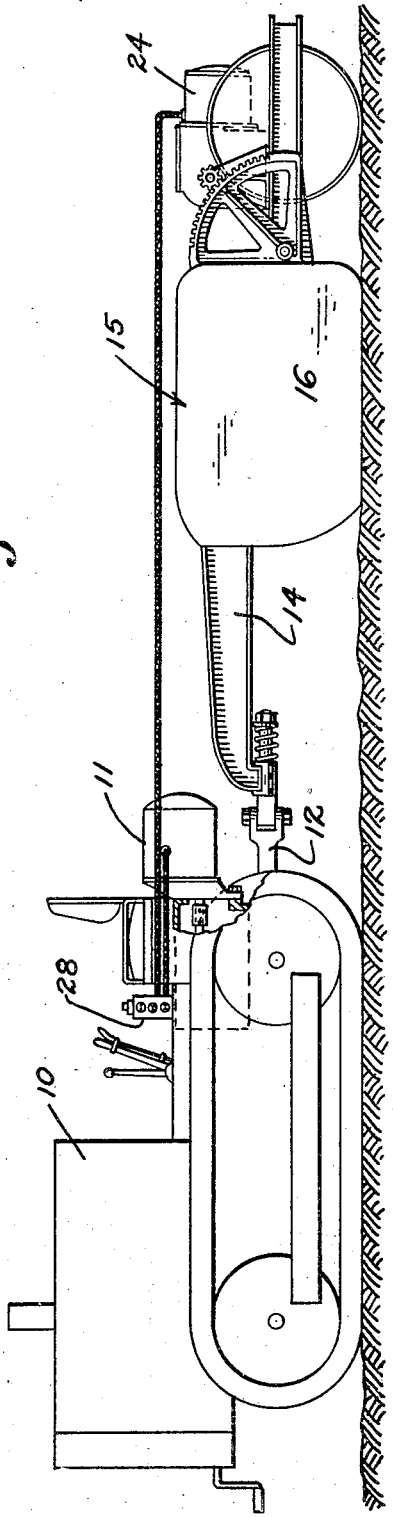
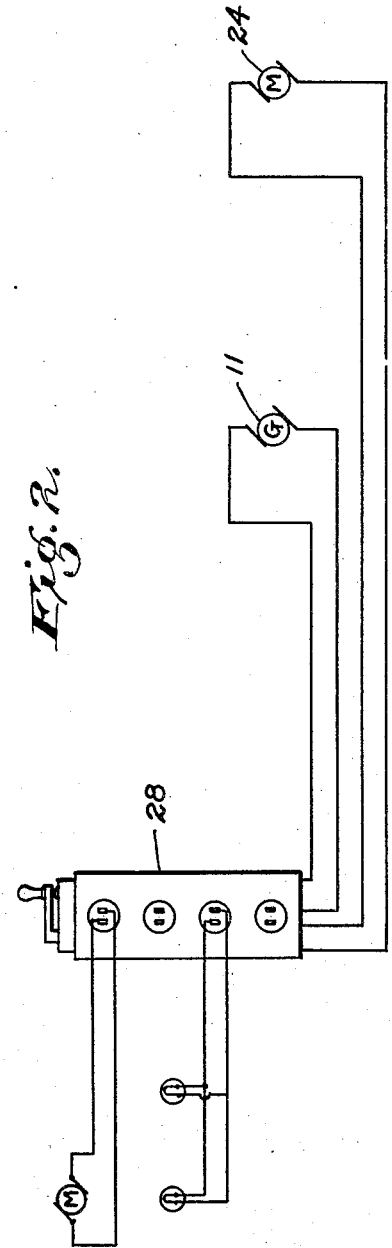
INVENTOR.
Carl B. Maloon.
BY
Townsend, Loftus & Affett
ATTORNEYS.

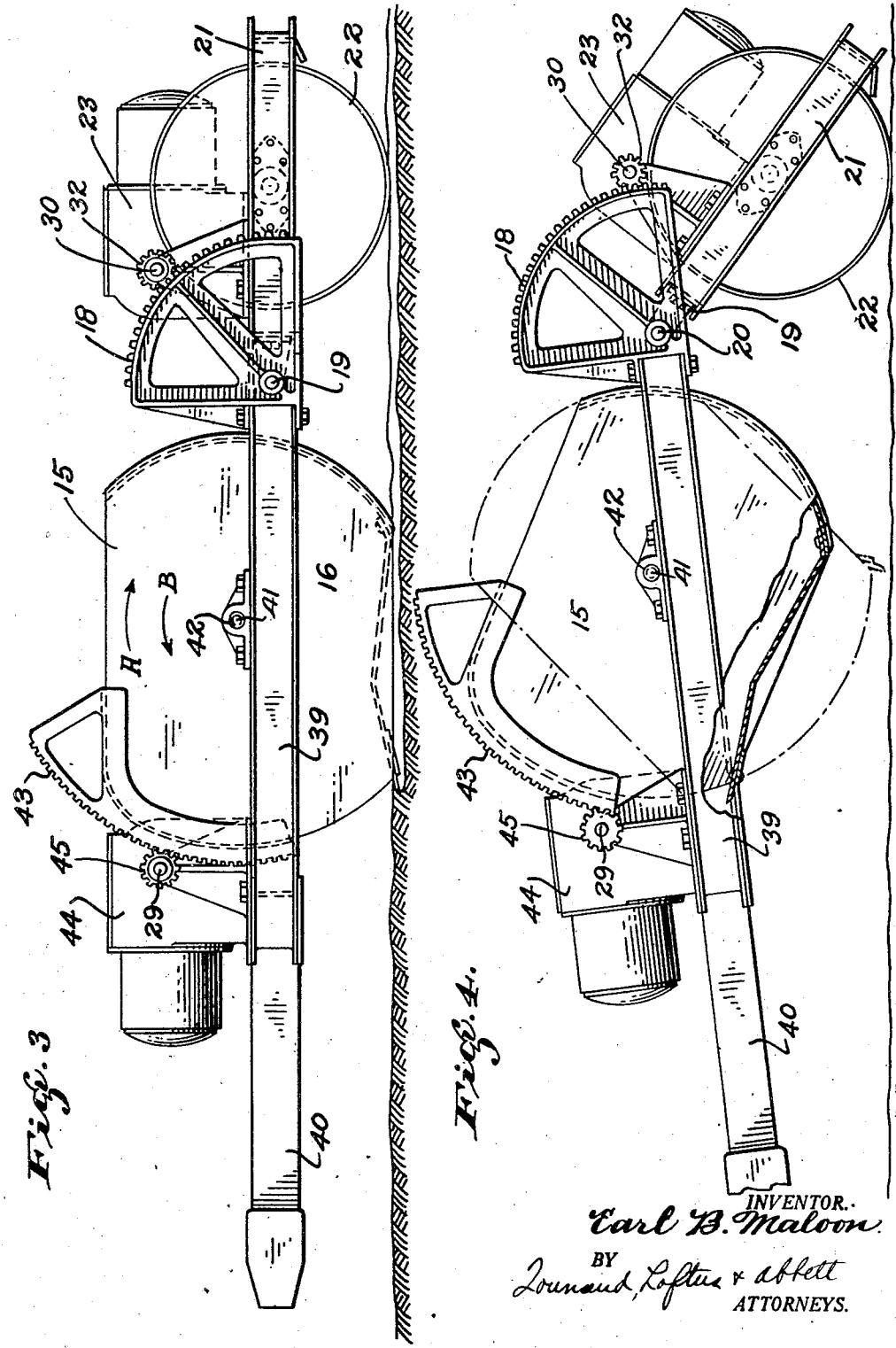

July 4, 1933.　　　　　E. B. MALOON　　　　1,916,864
SCRAPER
Filed May 20, 1931　　　4 Sheets-Sheet 3
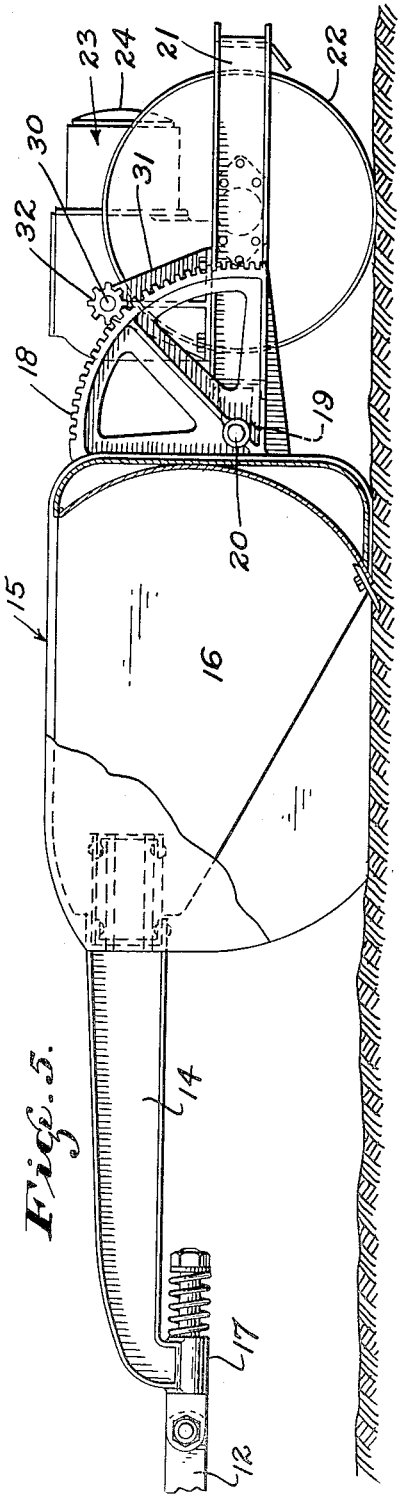
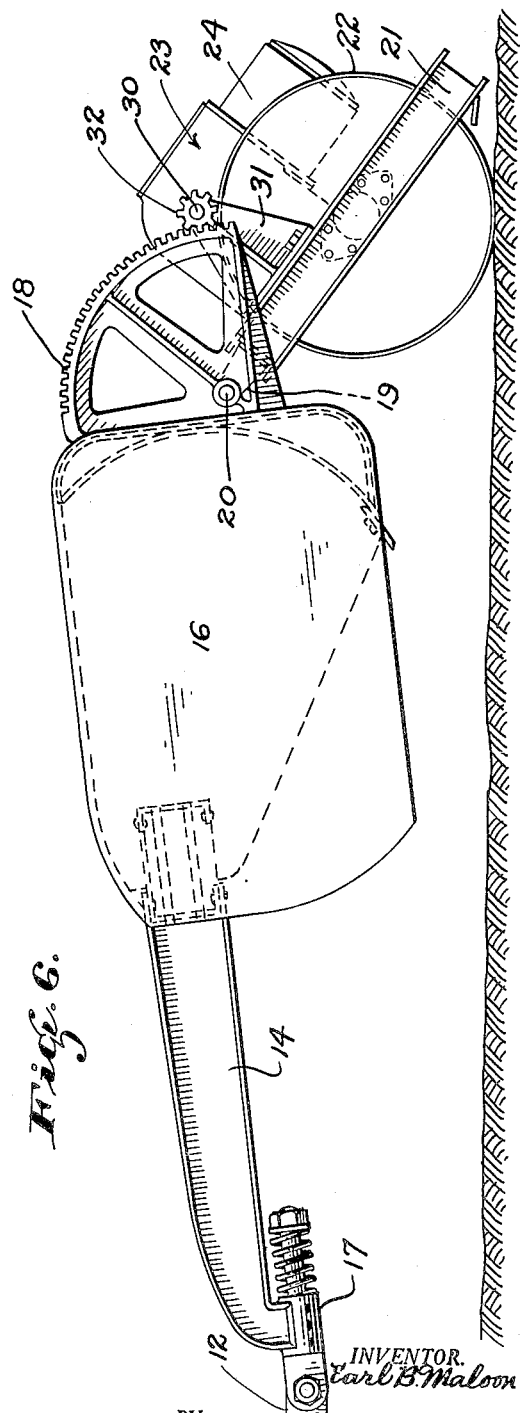
INVENTOR.
Earl B. Maloon
BY Townsend, Loftus & Abbett
ATTORNEYS.

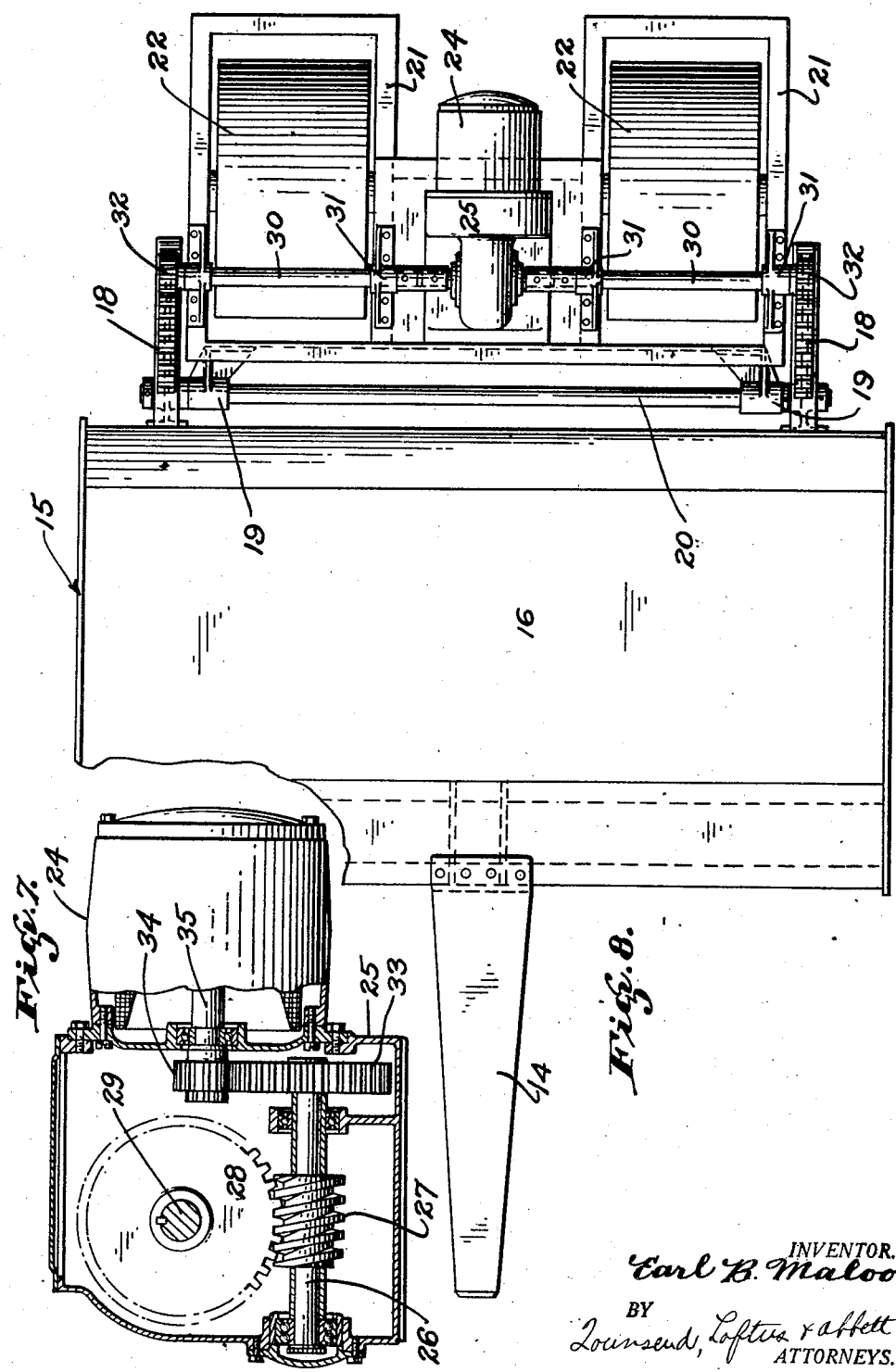

Patented July 4, 1933

1,916,864

UNITED STATES PATENT OFFICE

EARL B. MALOON, OF OAKLAND, CALIFORNIA, ASSIGNOR, BY DIRECT AND MESNE ASSIGNMENTS, TO PACIFIC TRACTOR EQUIPMENT INC., OF OAKLAND, CALIFORNIA, A CORPORATION OF CALIFORNIA

SCRAPER

Application filed May 20, 1931. Serial No. 538,763.

This invention relates to ground leveling apparatus and particularly pertains to scrapers of the drag and carrying types.

It is the principal object of the present invention to provide a generally improved scraper which may be raised or lowered while it is being drawn by a tractor, which operation is effected by electrical power means controlled from the tractor.

In carrying the invention into practice, I provide a scraper having a pivotal carriage or truck which may be operated by means of an electric motor to raise or lower the scraper relative to the ground. The scraper may be of the drag or carrying type. In the latter case motor driven apparatus is provided for operating the scraper bowl independently of the carriage to rotate the bowl about its central axis to enable it to be utilized to convey and discharge or spread material accumulated therein during the scraping operation.

The invention is exemplified in the following description and illustrated by way of example in the accompanying drawings in which:

Fig. 1 is a view in side elevation showing the scraper connected with the tractor.

Fig. 2 is a diagram of the electrical connections between the scraper and tractor.

Fig. 3 is a view in side elevation of a carrying type scraper embodying my invention.

Fig. 4 is a side elevation of the scraper shown in Fig. 3 with the bowl thereof in a different position.

Fig. 5 is a side elevation of a drag type scraper.

Fig. 6 is a view of the scraper illustrated in Fig. 5 and disclosing the bowl in raised position.

Fig. 7 is a view in elevation and section showing the motor unit employed.

Fig. 8 is a plan view of the drag type scraper illustrated in Figs. 5 and 6.

Referring more particularly to the accompanying drawings, I show an electrically operated scraper which may be drawn by a tractor. This electrically equipped tractor and auxiliary equipment is described and claimed in my copending application entitled Tractor and auxiliary apparatus, Ser. No. 538,764, filed May 20, 1931.

In general the tractor is equipped with an electric generator for generating current which may be connected to electrically operated mechanism on the scraper for operating the same. This enables complete control of the scraper from the tractor.

In the present instance I have shown two forms of scrapers, that form illustrated in Figs. 3 and 4 being a carrying type scraper while that illustrated in Figs. 5 and 6 being of the drag type.

Reference being had to Figs. 1 and 2 it will be seen that a tractor 10 is provided which is equipped with a generator assembly 11 which is operated from the power plant of the tractor as described in my copending application referred to. The tractor 10 is provided with a drawbar hitch 12 which is connected to the drawbar 14 of a scraper 15.

Reference being had to Figs. 5 and 6 it will be seen that the drag type scraper includes a bowl 16 of preferred design and dimensions. Projecting forwardly from the center of the bowl is the drawbar 14 fitted with a suitable hitch 17 for connection with the drawbar hitch of the tractor. At the rear of the scraper bowl 16 is a pair of segments 18 which are firmly fixed to the scraper and positioned one adjacent each end thereof. The segments 18 are each formed with a bearing 19 about which the toothed faces of the segments are concentric. A shaft 20 extends transversely of the scraper and journalled in its ends in the bearings 19. The shaft 20 is, of course, collared to prevent axial movement.

Pivoted to the shaft 20 is a carriage frame 21 which carries a pair of spaced rollers 22, the frame 21 being provided with suitable bearings for the axles of these rollers to enable the latter to freely rotate.

Mounted on the frame 21 intermediate the rollers is an electric motor assembly 23 most clearly illustrated in Fig. 7. Reference being had to this figure it will be seen that the motor assembly includes a motor casing 24 secured to a transmission housing 25. Journalled within this housing is a worm gear shaft 26 carrying a worm 27 which meshes with a worm wheel 28 which is keyed on a transverse shaft 29 which extends laterally through the housing. This shaft 29 is connected with end shafts 30 which are in axial alignment therewith and which are suitably journalled in bearings 31 carried by the frame 21. At the outer end of each shaft 30 is a fixed pinion 32 in mesh with the adjacent segment 18.

Obviously, therefore, when the shaft 29 is revolved, the pinions 32 will travel along the face of the segments 18 and tilt the frame 21 relative to the scraper bowl 16. Inasmuch as the rollers 22 are engaged with the ground, tilting movement of the frame in one direction will cause elevation of the scraper bowl and tilting movement in the opposite direction will tend to force the scraper blade of the bowl into the ground.

To operate the worm 27 and consequently the shaft 29 through the medium of the worm wheel 28, the worm shaft 26 is fitted with a spur gear 33 which is fixed on the worm shaft and which is in mesh with a pinion 34 fixed on the motor shaft 35. Therefore, when the motor 24 is placed in operation a drive will be transmitted from the pinion 34 to the worm shaft 26 through the medium of the spur gear 33 and thence to the shaft 29 through the medium of the worm 27 and worm wheel 28.

Electrical connections are suitably led from the distribution box 28 on the tractor which is electrically connected with the generator to the motor on the frame 21. The switches controlling the current delivered to the motor are also arranged on the tractor. An electrical diagram showing the electrical connections is illustrated in Fig. 2. The electrical current may be direct or alternating as desired and the connections between the generator and the motor arranged accordingly. The motor is, of course, of the reversible type so that the frame 21 may be tilted in either direction relative to the bowl.

In operation of the device as shown in Figs. 5 and 6, when it is desired to take a cut, the scraper bowl 16 is lowered until its scraper plate engages the ground by operation of the motor set 23 and swinging of the carriage frame 21 relative to the bowl 16. When it is desired to elevate the scraper, the carriage frame is tilted in the opposite direction through the operation of the motor set 23 which consequently causes elevation of the scraper bowl from the ground.

In Figs. 3 and 4 I have illustrated a carrying scraper which is provided with a suitably designed bowl 16 surrounded by a frame 39 provided at its forward end with a forwardly extending drawbar 40. The forward extremity of this drawbar is, of course, fitted with a suitable hitch so that it may be connected with the drawbar hitch of the tractor.

The bowl 16 is provided at its ends with substantially centrally located outwardly projecting trunnions 41. Rotatably received in bearings 42 carried by the sides of the frame 39. In this manner the bowl is substantially pivotally mounted in the frame 39. The rear of the frame 39 is equipped with a tilting carriage frame 21 constructed and arranged exactly the same as the carriage frame illustrated in connection with the device shown in Figs. 5 and 6. This tilting carriage frame 21 operates to raise and lower the bowl relative to the ground as previously described.

For the purpose of adjusting the position of the pivotal bowl 16 about its trunnions a pair of segments 43 are secured to the forward edge of the bowl 16 and arranged one at each end thereof. Secured on the frame 39 forwardly of the bowl 16 is an electric motor assembly 44 of the same construction as that utilized in connection with tilting of the frame 21, which construction is illustrated in Fig. 7. In this instance the outer extremities of the shaft 29 are fitted with pinions 45 in mesh with the segments 43. The toothed faces of these segments are concentric relative to the center of the trunnions 41 about which the bowl 16 revolves. Therefore, when the motor 44 is driven in one direction, the bowl 16 will be revolved in the direction of the arrow "A" in Fig. 3 and when the motor is driven in the opposite direction, the bowl will revolve in the direction of the arrow "B". The revolving of the motor is, of course, about the axis of the trunnions 41.

In operation of the device shown in Figs. 3 and 4, if it is desired to take a cut, the carriage frame 21 is tilted in the direction enabling lowering of the bowl. Through the medium of the tilting mechanism, which includes the motor set 44 and the segments 43, the scraper plate at the forward and bottom edge of the bowl may be tilted to the desired angle. The forward movement of the scraper will, of course, cause the scraper plate to take a desired cut from the surface and the dirt will be accumulated within the scraper bowl.

If it is desired to convey this dirt to another point, the motor set 23 at the rear of the scraper frame is placed in operation so as to elevate the frame 39 with respect to the ground and at the same time the motor set 44 may be placed in operation to swing the bowl about its pivotal points of suspension in the direction of the arrow "A" so as to retain the dirt within the scraper bowl. The scraper will then be drawn to any suitable point as it will travel on the rollers 22. When the point of discharge is reached the motor set 44 may be placed in operation to swing the bowl about its pivotal points in the direction of the arrow "B" and thus discharge the dirt from the scraper.

If it is desired to spread the dirt at the time of discharging from the bowl, the carriage frame 21 may be operated simultaneously with the operation of the bowl so that an even distribution of the dirt may be had as the scraper is drawn forwardly and the dirt is being discharged from the bowl.

From the foregoing it is obvious that I have provided an improved scraper which may be operated by electrical current derived from a generator on the tractor and which may be freely controlled and operated from the tractor.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A scraper of the character described comprising a frame including a drawbar by means of which it may be connected to a tractor, a wheeled carriage pivotally connected at its forward end to the rearmost end of said frame for swinging movement in a vertical plane, a scraper bowl rotatably supported on the frame, electrically operated means for swinging the carriage in a vertical plane relative to the frame for raising and lowering the latter, and electrically operated means for revolving the bowl.

2. A scraper of the character described comprising a main frame having a drawbar by means of which it may be connected with a tractor, a wheel carriage arranged at the rear of the frame and pivotally connected at its forward end to the frame for swinging movement in a vertical plane, an electric motor carried by the carriage, means operatively connecting the motor to the main frame whereby operation of the motor in one direction will swing the carriage in a direction raising the frame and operation of the motor in the opposite direction will swing the carriage to lower the frame, a scraper bowl carried by the frame and rotatable about a horizontal and transverse axis, an electric motor carried by the frame and operatively connected with the bowl to revolve the same about its axis.

3. A scraper of the character described comprising a main frame having a drawbar by means of which it may be connected with a tractor, a wheeled carriage arranged at the rear of the frame and pivotally connected at its forward end to the frame for swinging movement in a vertical plane, an electric motor carried by the carriage, means operatively connecting the motor to the main frame whereby operation of the motor in one direction will swing the carriage in a direction raising the frame and operation of the motor in the opposite direction will swing the carriage to lower the frame, a scraper bowl carried by the frame and rotatable about a horizontal and transverse axis, an electric motor mounted on the frame, a pinion driven by said motor, a segment relatively secured to said bowl and concentric to the pivotal axis of the bowl and in mesh with said pinion, said motor being reversible whereby it may swing the bowl in either direction.

4. A scraper of the character described comprising a main frame having a drawbar by means of which it may be connected with a tractor, a wheeled carriage arranged at the rear of the frame and pivotally connected at its forward end to the frame for swinging movement in a vertical plane, an electric motor carried by the carriage, means operatively connecting the motor to the main frame whereby operation of the motor in one direction will swing the carriage in a direction raising the frame and operation of the motor in the opposite direction will swing the carriage to lower the frame, a scraper bowl carried by the frame and rotatable about a horizontal and transverse axis, a reversible electric motor mounted on the frame, and connecting mechanism between the motor and the bowl whereby operation of the motor will rotate the bowl.

5. A scraper of the character described comprising a main frame arranged horizontally and fitted at its forward end with a drawbar whereby it may be connected with a tractor, a wheeled carriage arranged at the rear of the frame and pivotally connected at its forward end to the frame for swinging movement in a vertical plane, a reversible electric motor mounted on the carriage, a shaft arranged transversely of the carriage and adapted to be driven by the motor, a pair of pinions on said shaft, a pair of segments fixed to the frame and having a toothed surface concentric with respect to the pivotal axis of the carriage, said segments being in mesh with said pinions whereby operation of the motor will swing the carriage in accordance with the direction in which the motor is operating and thereby raise or lower the frame, a scraper bowl pivotally mounted in the frame, a pair of segments fixed to the bowl and having toothed surfaces concentric with the pivotal axis of the bowl, a transverse shaft carried by the frame, pinions on said shaft in mesh with said segments, and a reversible electric motor operatively connected with said shaft to drive the same.

EARL B. MALOON.